United States Patent
Yoshida

(10) Patent No.: US 8,937,739 B2
(45) Date of Patent: Jan. 20, 2015

(54) IMAGE PROCESSING SYSTEM FOR PERFORMING UPPER LIMIT MANAGEMENT OF PRINT VOLUME

(71) Applicant: Hidetaka Yoshida, Kyoto (JP)

(72) Inventor: Hidetaka Yoshida, Kyoto (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/692,283

(22) Filed: Dec. 3, 2012

(65) Prior Publication Data

US 2013/0141761 A1  Jun. 6, 2013

(30) Foreign Application Priority Data

Dec. 6, 2011  (JP) .................... 2011-266869

(51) Int. Cl.
 *G06F 3/12* (2006.01)
 *G06K 15/22* (2006.01)
 *G06K 15/00* (2006.01)

(52) U.S. Cl.
 CPC ............ *G06F 3/1237* (2013.01); *G06F 3/1207* (2013.01); *G06F 3/1239* (2013.01); *G06F 3/1288* (2013.01)
 USPC .......................... 358/1.15; 358/1.4; 358/1.16

(58) Field of Classification Search
 None
 See application file for complete search history.

(56) References Cited

U.S. PATENT DOCUMENTS

| 2004/0047643 | A1* | 3/2004 | Jackelen et al. ................ 399/81 |
| 2008/0030750 | A1* | 2/2008 | Kato ............................. 358/1.4 |
| 2011/0170131 | A1  | 7/2011 | Kondo |

FOREIGN PATENT DOCUMENTS

| JP | 2005-024959 A | 1/2005 |
| JP | 2007249563 | 9/2007 |
| JP | 2008140067 | 6/2008 |
| JP | 2008140070 | 6/2008 |
| JP | 2008141432 | 6/2008 |
| JP | 2008176717 | 7/2008 |
| JP | 2009-255405 A | 11/2009 |
| JP | 2010-069768 A | 4/2010 |

OTHER PUBLICATIONS

Office Action (Notice of Grounds of Rejection) issued on Feb. 12, 2014, by the Japan Patent Office in corresponding Japanese Patent Application No. 2011-266869, and an English Translation of the Office Action. (7 pages).

* cited by examiner

*Primary Examiner* — Thomas Lett

(74) *Attorney, Agent, or Firm* — Buchanan Ingersoll & Rooney PC

(57) ABSTRACT

A server included in an image processing system executes processing including: upon accepting a job issued, before the job is processed by an MFP, specifying a usage amount of the MFP in a case where the job is processed by the MFP, as a usage amount for the job, and reserving the usage amount for the job from the usage amount of the MFP permitted to an issuer of the job; and upon reservation of the usage amount for the job, storing the job in association with the usage amount for the job.

26 Claims, 14 Drawing Sheets

FIG.5
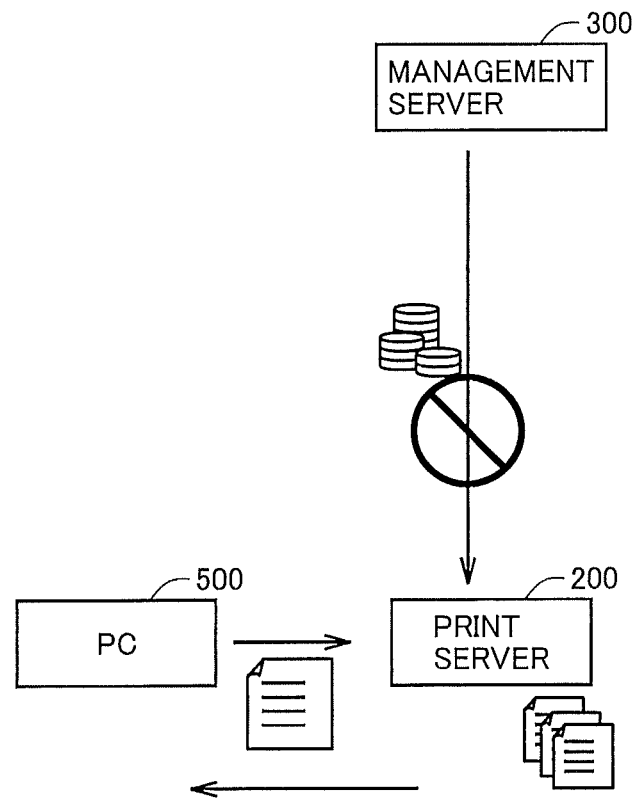
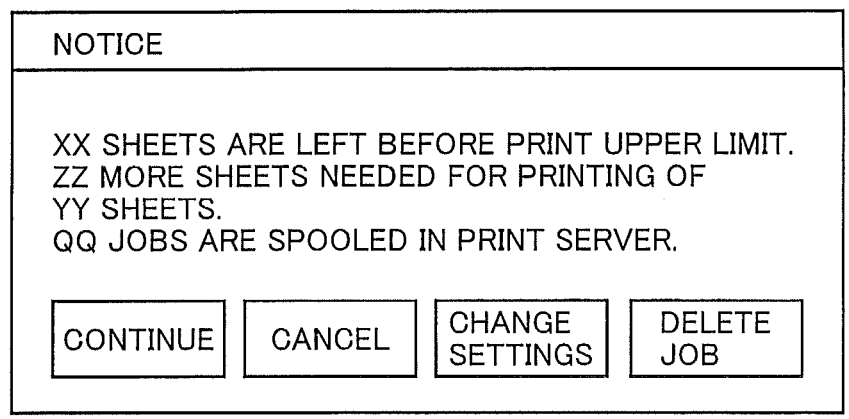

IMAGE PROCESSING SYSTEM FOR PERFORMING UPPER LIMIT MANAGEMENT OF PRINT VOLUME

This application is based on Japanese Patent Application No. 2011-266869 filed with the Japan Patent Office on Dec. 6, 2011, the entire content of which is hereby incorporated by reference.

BACKGROUND OF THE INVENTION

1. Field of the Invention

The present invention relates to an image processing system, a server, an image forming apparatus, and a management method, and more particularly to an image processing system, a server, an image forming apparatus, and a management method for performing upper limit management of print volume.

2. Description of the Related Art

An image processing system including a print server can spool a print job in the print server. In this image processing system, an image forming apparatus acquires a print job spooled in the print server based on an instruction from a user and executes a print process.

For example, in some office environments, upper limit management of the usage amount of an image forming apparatus is performed. The upper limit management of the usage amount refers to such management that permits use of an image forming apparatus within an upper limit of such usage amount as the number of prints for a predetermined period that is allocated to a user or a group (division or department) to which a user belongs. For upper limit management, the image processing system includes a management server, which stores an upper limit for each user.

FIG. 15 is a diagram illustrating an example of upper limit management of number of prints in an image processing system. Referring to FIG. 15, an image processing system includes a management server for managing an upper limit, a print server for spooling a print job, and an image forming apparatus. The image forming apparatus acquires a print job to be processed from the print server in accordance with the user's instruction and executes a print process (STEP 1). Here, the image forming apparatus debits a balance of the upper limit allocated to the login user from the management server for executing a print process (STEP 2). In STEP 2, the image forming apparatus requests the management server to credit the balance of the required number based on the print job. The management server credits the image forming apparatus with the requested number within the limit of the remaining number for the user and reduces the remaining number of the user accordingly.

Here, when the number of prints reaches the upper limit value during a print process of the designated print job, the print process is terminated at that point of time even if a print job is left in the print server. Therefore, although the user has gone to the image forming apparatus for execution of a print process, the user cannot make the print process done.

As an image processing system that performs upper limit management in this manner, for example, Japanese Laid-Open Patent Publication No. 2007-249563 discloses an information processing system for assisting in achieving a target. Specifically, a target period and a target value of the usage amount are stored. The usage amount at the end of the target period is predicted and compared with the target value, and if it is predicted that it is difficult to achieve the target, the job mode is automatically changed.

Japanese Laid-Open Patent Publication No. 2008-176717 discloses an image processing system that automatically performs cancellation of all jobs and Nup printing (N pages are printed on one page) when an upper limit value is exceeded.

Japanese Laid-Open Patent Publication No. 2008-140067 discloses a usage restriction method in an image forming apparatus, in which a permissible usage amount permitted to a group to which a plurality of users belong is stored in a server. When a user wishes to use any one of image forming apparatuses, the user is permitted to use only a part of the permissible usage amount stored in the server for the group to which the user belongs.

Japanese Laid-Open Patent Publication No. 2008-140070 discloses a system in which a permissible usage amount of an image forming apparatus is allocated to a user, and the permissible usage amount is allocated to an image forming apparatus as an allocated permissible usage amount in accordance with a request from the image forming apparatus. The permissible usage amount allocated to the user is updated such that the allocated permissible usage amount is reduced from the present permissible usage amount of the user. In this system, if the permissible usage amount of the user is negative at present when the use of the image forming apparatus is additionally permitted to the user by a predetermined amount, the permissible usage amount of the image forming apparatus to be permitted to the user is updated such that the difference between the predetermined amount and the absolute value of the permissible usage amount is indicated.

Japanese Laid-Open Patent Publication No. 2008-141432 discloses a system in which an upper limit of the usage amount is set for a group to which a plurality of users belong. In this case, when a plurality of users use a plurality of image forming apparatuses simultaneously, a usage amount allocated in advance is credited to each user at the start of processing, and the remaining usage amount is returned at the point of time when the usage amount in the image forming apparatus is finalized.

However, with the techniques disclosed in the documents above, when the number of prints reaches an upper limit value in the middle of printing a job accumulated in a server, the print is stopped during progress of processing the job even if a job not yet printed is left in the server. Therefore, the user cannot obtain the print results of all the designated jobs although the user has operated the image forming apparatus.

Japanese Laid-Open Patent Publication No. 2008-176717 performs cancellation of all jobs or Nup printing so that the usage amount falls within the upper limit. However, all the designated jobs are not always printed even with such a design change, and the print results of all the designated jobs cannot be obtained when the upper limit is reached during job processing.

SUMMARY OF THE INVENTION

The present invention is made in view of such a problem. An object of the present invention is to provide an image processing system that manages the upper limit of usage amount of an image forming apparatus, a server, an image forming apparatus, and a management method, in which failure to process a job spooled in the server and termination of a process due to the usage amount of the image forming apparatus reaching the upper limit during job processing can be prevented, thereby improving the user's convenience.

In order to achieve the object above, according to an aspect of the present invention, an image processing system includes a server for managing a job, and an image forming apparatus. The server executes processing including: upon accepting the job issued, before the job is processed by the image forming apparatus, specifying a usage amount of the image forming apparatus in a case where the job is processed by the image forming apparatus, as a usage amount for the job, and reserving the usage amount for the job from the usage amount of the image forming apparatus that is permitted to an issuer of the job; and upon reservation of the usage amount for the job, storing the job in association with the usage amount of the job.

Preferably, when the stored job is updated, the server updates the usage amount for the job in accordance with the update and allows a difference from the usage amount for the job before update to be reflected in the usage amount of the image forming apparatus that is permitted to an issuer of the job.

More preferably, when the stored job is deleted, the server returns the usage amount for the job to the usage amount of the image forming apparatus that is permitted to an issuer of the job.

Preferably, when the job is requested by the image forming apparatus, the server transmits the job and information indicative of the usage amount for the job to the image forming apparatus, and the image forming apparatus returns a difference between the usage amount of the image forming apparatus in processing the job and the usage amount for the job, to the usage amount of the image forming apparatus that is permitted to an issuer of the job.

Preferably, if the usage amount for the job is greater than the usage amount of the image forming apparatus that is permitted to an issuer of the job, the server requests deletion of another job stored prior to the job from an issuer of another job.

More preferably, if a plurality of other jobs are stored prior to the job, the server selects a job of which deletion is requested, in accordance with attributes of the plurality of other jobs.

Preferably, if a reply to the request is not given from an issuer of another job for a predefined period, the server does not delete another job.

Preferably, if the usage amount for the job is greater than the usage amount of the image forming apparatus that is permitted to an issuer of the job, the server requests an issuer of another job stored prior to the job to change setting of another job concerning the usage amount of the image fainting apparatus such that the usage amount is reduced.

More preferably, if a plurality of other jobs are stored prior to the job, the server selects a job of which setting concerning the usage amount of the image forming apparatus is requested to be changed among the plurality of other jobs, in accordance with attributes of the plurality of other jobs.

More preferably, the server determines the usage amount for the job so as to fall within the usage amount of the image forming apparatus that is permitted to an issuer of the job, by selecting a job of which setting concerning the usage amount of the image forming apparatus is requested to be changed, in decreasing order of the usage amount of the image forming apparatus for each of the plurality of other jobs, and then changing the setting concerning the usage amount of the image forming apparatus step by step in order in which a difference from original setting for the selected job increases.

Preferably, if a reply to the request is not given from an issuer of another job for a predefined time, the server does not change setting of another job.

According to another aspect of the present invention, a server includes a controller for managing a job. The controller executes processing including: upon accepting the job issued, before the job is processed by an image forming apparatus, specifying a usage amount of the image forming apparatus in a case where the job is processed by the image forming apparatus, as a usage amount for the job, and reserving the usage amount for the job from the usage amount of the image forming apparatus that is permitted to an issuer of the job; and upon reservation of the usage amount for the job, storing the job in association with the usage amount for the job.

According to a further aspect of the present invention, an image forming apparatus includes a controller for managing a job. The controller executes processing including: upon accepting the job issued, before the job is processed by the image forming apparatus, specifying a usage amount of the image forming apparatus in a case where the job is processed by the image forming apparatus, as a usage amount for the job, and reserving the usage amount for the job from the usage amount of the image forming apparatus that is permitted to an issuer of the job; and upon reservation of the usage amount for the job, storing the job in association with the usage amount for the job.

According to a still further aspect of the present invention, a method of managing a usage amount of an image forming apparatus for an issuer of a job includes the steps of: accepting the job issued; specifying a usage amount of the image forming apparatus in a case where the job is processed by the image forming apparatus, as a usage amount for the job; reserving the usage amount for the job from the usage amount of the image forming apparatus that is permitted to the issuer of the job; and upon reservation of the usage amount for the job, storing the job in association with the usage amount for the job into a storage device.

According to yet another aspect of the present invention, a non-transitory computer-readable storage medium is encoded with a program for causing a server to perform a process of managing a job. The program instructs a controller of the server to perform processing including the steps of: accepting the job issued; specifying a usage amount of an image forming apparatus in a case where the job is processed by the image forming apparatus, as a usage amount for the job; reserving the usage amount for the job from the usage amount of the image forming apparatus that is permitted to an issuer of the job; and upon reservation of the usage amount for the job, storing the job in association with the usage amount for the job into a storage device.

According to still another aspect of the present invention, a non-transitory computer-readable storage medium is encoded with a program for causing an image forming apparatus to perform a process related to a job. The program instructs a controller of the image forming apparatus to perform processing including the steps of: accepting an instruction to process a job; requesting the designated job from a server that stores the job; receiving, from the server, the job and a usage amount of the image forming apparatus in a case where the job is processed by the image forming apparatus that is associated with the job, as a usage amount for the job; processing the job; and giving a notification of a difference between the usage amount of the image forming apparatus in processing the job and the usage amount for the job, to a server that manages the usage amount of the image forming apparatus for an issuer of the job.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 to FIG. 8 are diagrams illustrating an operation overview in the image processing system according to the embodiment.

DESCRIPTION OF THE PREFERRED EMBODIMENTS

An embodiment of the present invention will be described below with reference to the figures. In the following description, the same parts and components are denoted with the same reference signs. Their names and functions are also the same.

<System Configuration>

Figure 1:
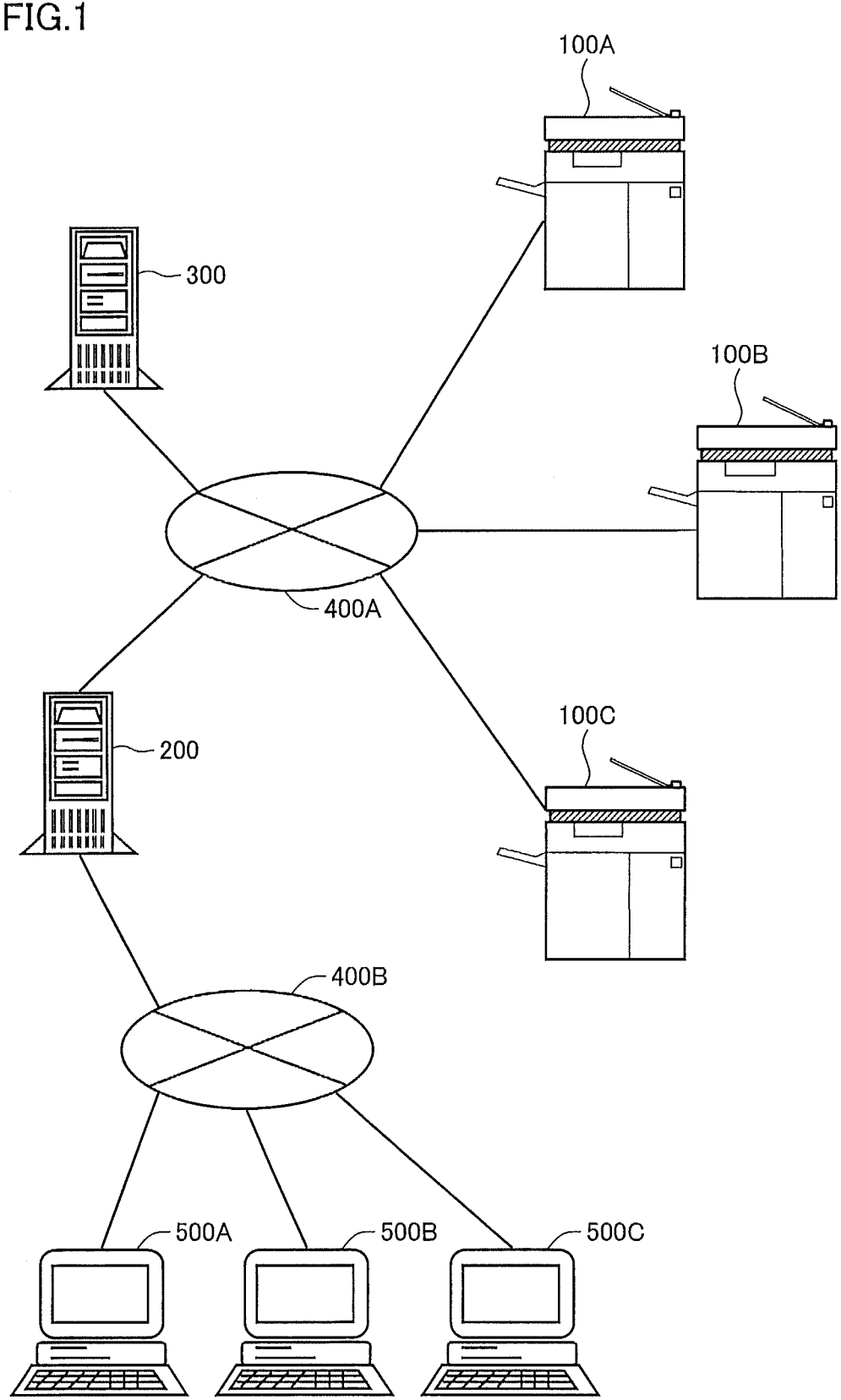
FIG. 1 is a diagram showing a specific example of a configuration of an image processing system according to an embodiment.

FIG. 1 is a diagram showing a specific example of a configuration of an image processing system according to the present embodiment.

Referring to FIG. 1, the image processing system includes a plurality of MFPs 100A, 100B, and 100C as image forming apparatuses having a print function, a print server 200 as a server for spooling a print job, and a management server 300 as a server for performing upper limit management of the usage amount for each user or for each group including a plurality of users. They are connected to be able to communicate via a network 400A. A plurality of MFPs 100A, 100B, and 100C are also collectively called MFP 100.

The image processing system further includes a plurality of PCs (Personal Computers) 500A, 500B, and 500C as job issuing devices, which are connected with print server 200 via a network 400B. A plurality of PCs 500A, 500B, and 500C are also collectively called PC 500.

In the example in FIG. 1, the image processing system includes a plurality of MFPs 100A, 100B, and 100C and a plurality of PCs 500A, 500B, and 500C. However, only one MFP 100 and only one PC 500 may be included. The image forming apparatus is not limited to an MFP and may be any device that has a print function, such as a copier or a printer. The MFP refers to an image forming apparatus having copier, printer, and facsimile functions all in one.

The job issuing device is not limited to a PC and may be a portable terminal such as a notebook PC, a mobile phone, a PDA (Personal Digital Assistant) or a digital camera.

In the following description, management server 300 manages the number of prints as the usage amount of MFP 100. More specifically, the upper limit of the number of prints is allocated in advance as the upper limit of the usage amount for a predetermined period (for example, one month, one year, etc.) for each user or for each group to which a plurality of users belong. The number of prints in the predetermined period is controlled to fall within the upper limit. Specifically, control is performed such that print exceeding the allocated upper limit is not performed. In the example below, the number of prints for a predetermined period is managed for each group to which a plurality of users belong.

The usage amount is not limited to the number of prints. When a cost is incurred per image forming process, cost management may be performed by allocating the cost upper limit in a predetermined period for each group, or consumable consumption management may be performed by allocating the upper limit of toner or any other consumables excluding print paper.

<Apparatus Configuration>

Figure 2:
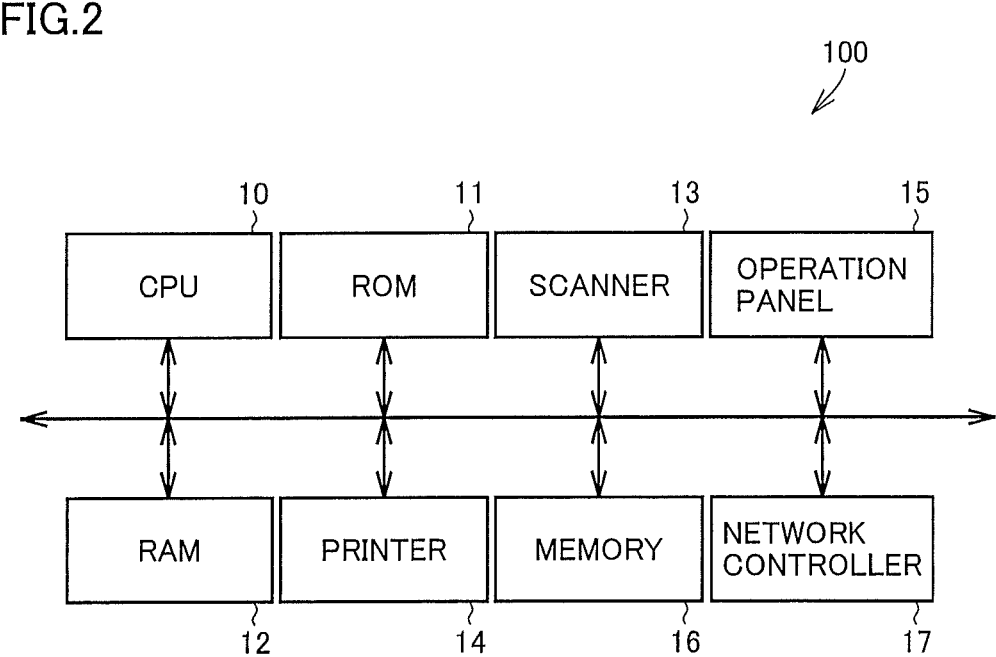
FIG. 2 is a diagram showing a specific example of a hardware configuration of an MFP (Multi-Functional Peripheral) included in the image processing system.

FIG. 2 is a diagram showing a specific example of a hardware configuration of MFP 100.

Referring to FIG. 2, MFP 100 includes a CPU (Central Processing Unit) 10 as an arithmetic unit for the entire control, a ROM (Read Only Memory) 11 for storing a program executed in CPU 10, a RAM (Random Access Memory) 12 for functioning as a working area when a program is executed in CPU 10, a scanner 13 for obtaining image data by optically scanning a document placed on a not-shown platen, a printer 14 for fixing image data on print paper, an operation panel 15 including a touch panel for displaying information and accepting operation input to MFP 100, a memory 16 for storing image data, and a network controller 17 for controlling communication over network 400A.

Operation panel 15 includes a not-shown touch panel and operation keys. The touch panel is comprised of a display such as a liquid crystal display and a position designation device such as an optical touch panel or a capacitive touch panel to display an operation screen and specify a designated position on the operation screen. CPU 10 allows the touch panel to display an operation screen based on prestored data for screen display.

Print server 200 and management server 300 may be each configured with a general PC. Therefore, the hardware configuration thereof is similar to the hardware configuration of a general PC.

Figure 3:
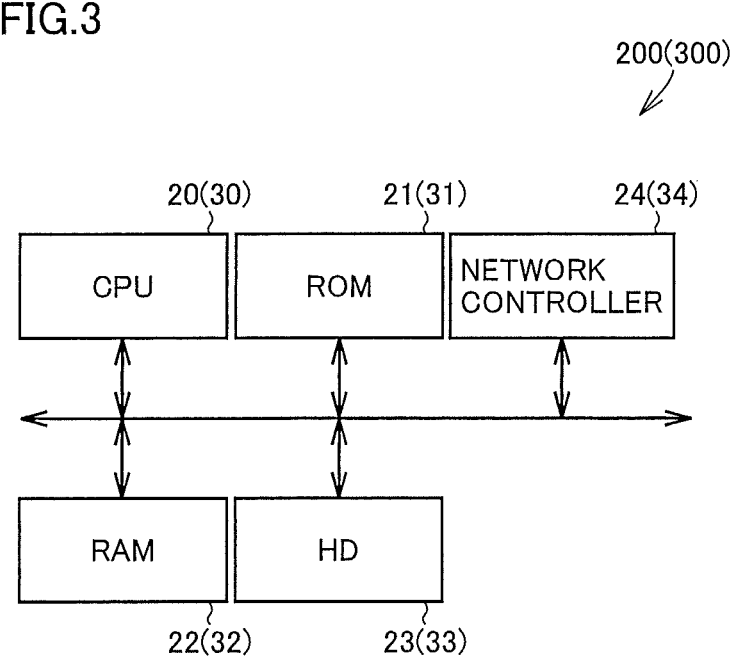
FIG. 3 is a diagram showing an example of a hardware configuration of a print server and a management server included in the image processing system.

FIG. 3 is a diagram showing an example of a hardware configuration of print server 200 and management server 300. Print server 200 and management server 300 may have the same configuration, and, therefore, the configuration of management server 300 is parenthesized in the figure.

Referring to FIG. 3, print server 200 includes a CPU 20 as an arithmetic unit for the entire control, a ROM 21 for storing a program executed in CPU 20, a RAM 22 for functioning as a working area when a program is executed in CPU 20, an HD (Hard Disk) 23 as a storage for storing a job and the like, and a network controller 24 for controlling communication over the network.

Management server 300 and print server 200 may have the same configuration, and the upper limit of the number of prints and the balance for each user or for each user group including a plurality of users are stored in a partial region of HD 33.

PC 500 may be configured with a general PC, and the hardware configuration thereof is similar to the hardware configuration of a general PC and is not limited to a specific configuration in the present application.

<Operation Overview>

FIG. 4 to FIG. 8 are diagrams illustrating an operation overview in the image processing system according to the embodiment.

Figure 4:
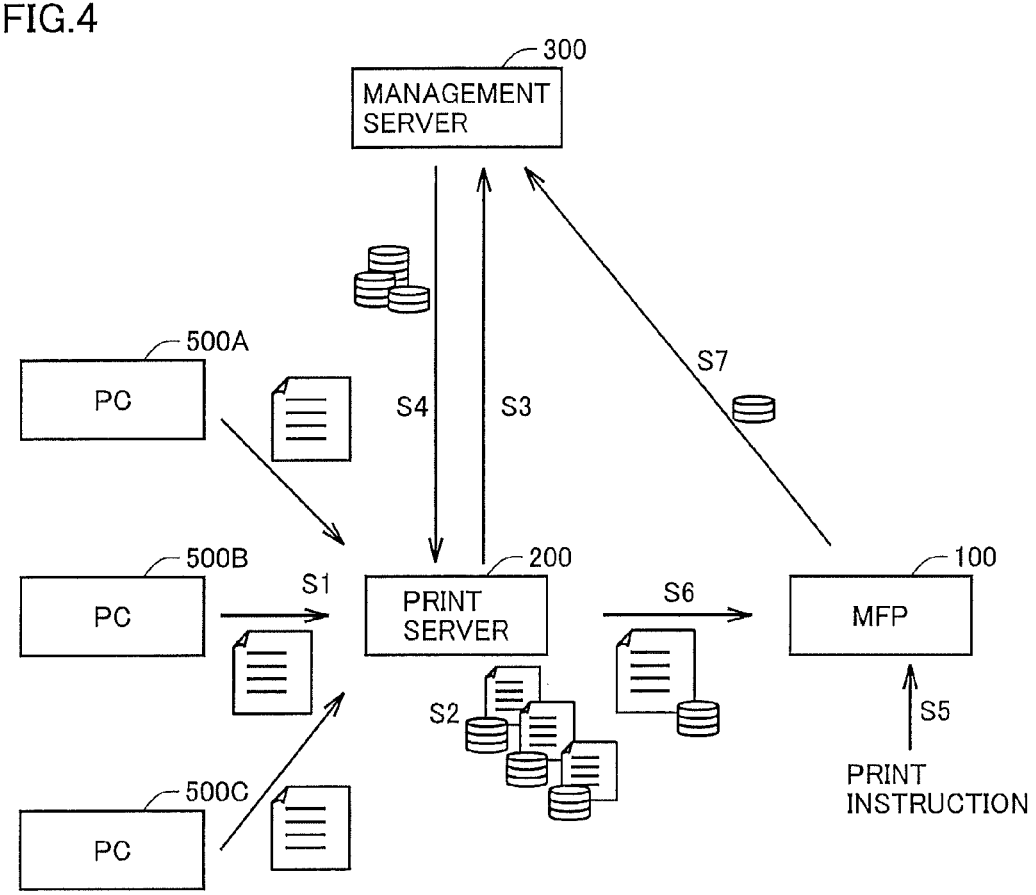

FIG. 4 illustrates an overview of normal operation. More specifically, referring to FIG. 4, when a job is issued from each PC 500 to print server 200 (step S1), print server 200 stores the jobs and analyzes them (step S2). Then, at the timing when the job is received, the number of prints is detected for each job, and the balance corresponding to the detected number of prints is requested from management server 300 from the present possible number of prints (balance) allocated to the group to which the user belongs (step S3).

In response to this request, if the requested balance is smaller than the present balance allocated to the group, management server 300 transmits and credits the requested balance to print server 200 (step S4).

Thereafter, when the user instructs MFP 100 to print the job (step S5), print server 200 transmits the designated job to MFP 100 and also transmits the balance credit for the job from management server 300 to MFP 100 (step S6).

MFP 100 executes a print process in accordance with the user's instruction. Here, if the balance transferred from print server 200 is left over after the print process, the remaining balance is returned to management server 300 (step S7). For example, this is the case where printing of the job is interrupted by the user's instruction.

In the flow illustrated in FIG. 4, if the number required for printing the job is greater than the present balance allocated to the group to which the user issuing the job belongs, management server 300 cannot credit the requested balance to print server 200.

FIG. 5 is a diagram illustrating a specific example of the operation in this case. More specifically, referring to FIG. 5, if the requested number from print server 200 is greater than the present balance allocated to the group, management server 300 cannot credit the balance to print server 200 and gives a notification thereof to print server 200.

Print server 200 receives the notification from management server 300 at the point of time when it receives the job, and thus transmits information for displaying a notice screen to PC 500 that issues the job. A specific example of the notice screen is as shown in FIG. 5 to indicate the present balance (XX sheets) allocated to the group to which the user belongs, the number of sheets (YY sheets) detected to be required for printing the issued job, the number of shortage sheets, which is the difference therebetween (ZZ sheets=YY sheets−XX sheets), and the number of jobs (QQ) that are issued by users belonging to the group and are spooled at present in print server 200. These pieces of information are included in the notification from management server 300 or are calculated in print server 200 based on the information included in the notification. Print server 200 generates information for displaying a notice screen by incorporating these pieces of information into a prestored format for displaying a notice screen.

The notice screen as shown in FIG. 5 appears on PC 500 to notify the user who issued the job that a balance deficit may occur before starting printing the job.

Examples of the operation that follows include continuation of spooling of the job, cancellation of printing of the job, a setting change of any one of jobs that are issued by users belonging to the group and are spooled in print server 200, and deletion of any one of jobs that are issued by users belonging to the group and are spooled in print server 200. One of these operations can be selected on the notice screen appearing on PC 500.

Figure 6:
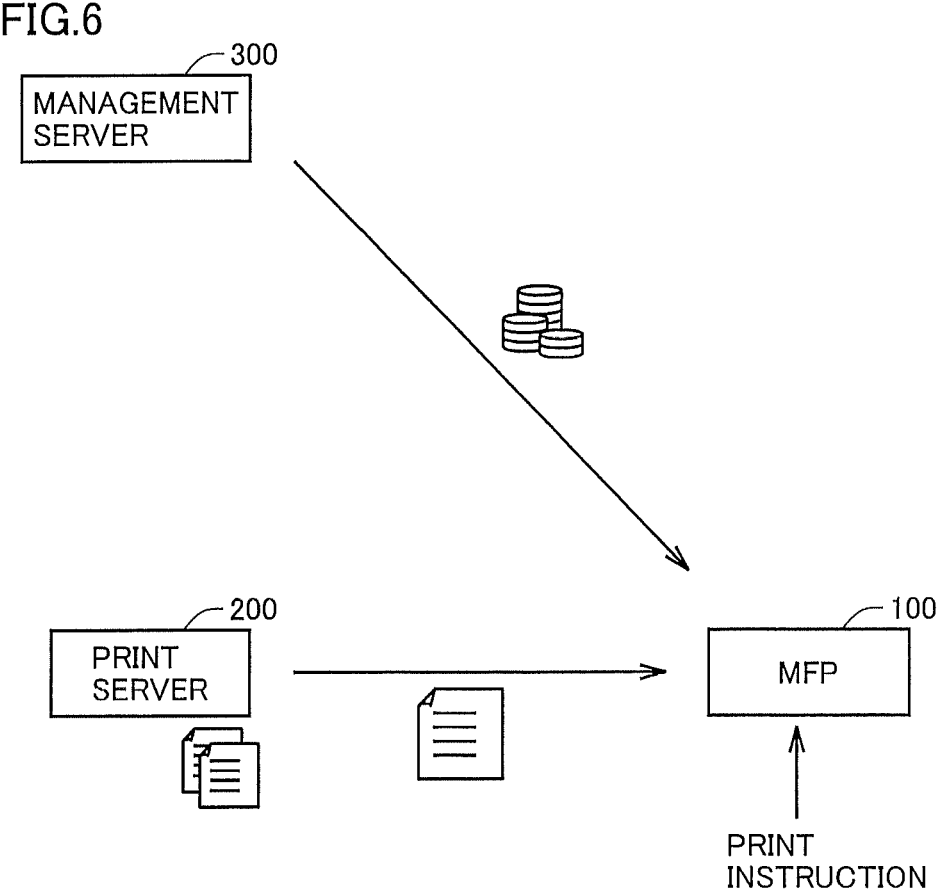

FIG. 6 illustrates a flow of operation in the case where continuation of spooling of the job is selected on the notice screen in FIG. 5. More specifically, referring to FIG. 6, in this case, print server 200 spools the job without associating it with the balance. Then, when a print instruction is given to MFP 100, print server 200 transmits the designated job to MFP 100. MFP 100 requests the balance from management server 300 and then executes a print process. In this case, for example, if another job that is issued by a user belonging to the group and is spooled in print server 200 is cancelled and the balance requested for the cancelled job is then returned to management server 300, printing is allowed using the present balance of the group at the point of time of printing the job. Then, the balance is transferred from management server 300 in response to a request from MFP 100 to enable printing of the job.

Figure 7:
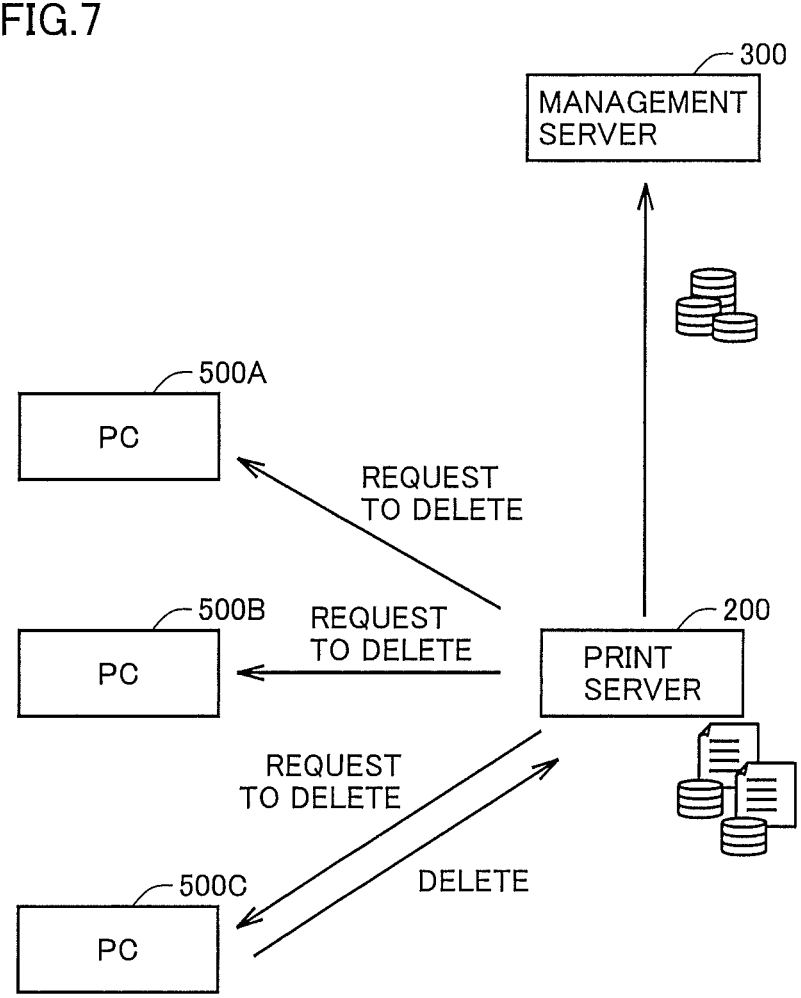

FIG. 7 is a flow of operation in the case where deletion of any one of jobs that are issued by users belonging to the group and are spooled in print server 200 is selected on the notice screen in FIG. 5. More specifically, referring to FIG. 7, in this case, print server 200 requests deletion of at least one of the jobs that are issued by users belonging to the group and are spooled at present, from PCs 500 that issue the jobs.

For example, this request may be displayed on the display of PC 500, and an instruction to delete may be given in accordance with the screen and transmitted to print server 200.

For example, when an instruction to delete is given from any one of PCs (PC 500C in FIG. 7) in response to the request through operation in accordance with the screen, print server 200 deletes the corresponding job from HD 23 and returns the balance of the group that is debited from management server 300 for the job when the job is spooled, to management server 300. Accordingly, the balance of the group is increased, so that the possibility that all the jobs of the group spooled in print server 200 can be printed is increased.

Here, print server 200 may request deletion of all the jobs issued by users belonging to the group or may request detection of the jobs selected in accordance with the attributes of the jobs. Examples of the selection method are as follows. A predetermined number of jobs may be selected in order of date and time of jobs created or in order of spooling, as job attributes. If priority order is given to the jobs as a job attribute, a predetermined number of jobs may be selected in order of increasing priority. If ranking is predefined in accordance with the attribute of the job creator (the ranks in the company, for example), as a job attribute, a predetermined number of jobs may be selected in order of increasing ranking. A predetermined number of jobs may be selected in decreasing order of the balance credited for the jobs from management server 300. Alternatively, jobs may be selected until the total number of prints of the jobs of the group that are spooled in print server 200 falls within the balance allocated to the group at present.

Figure 8:
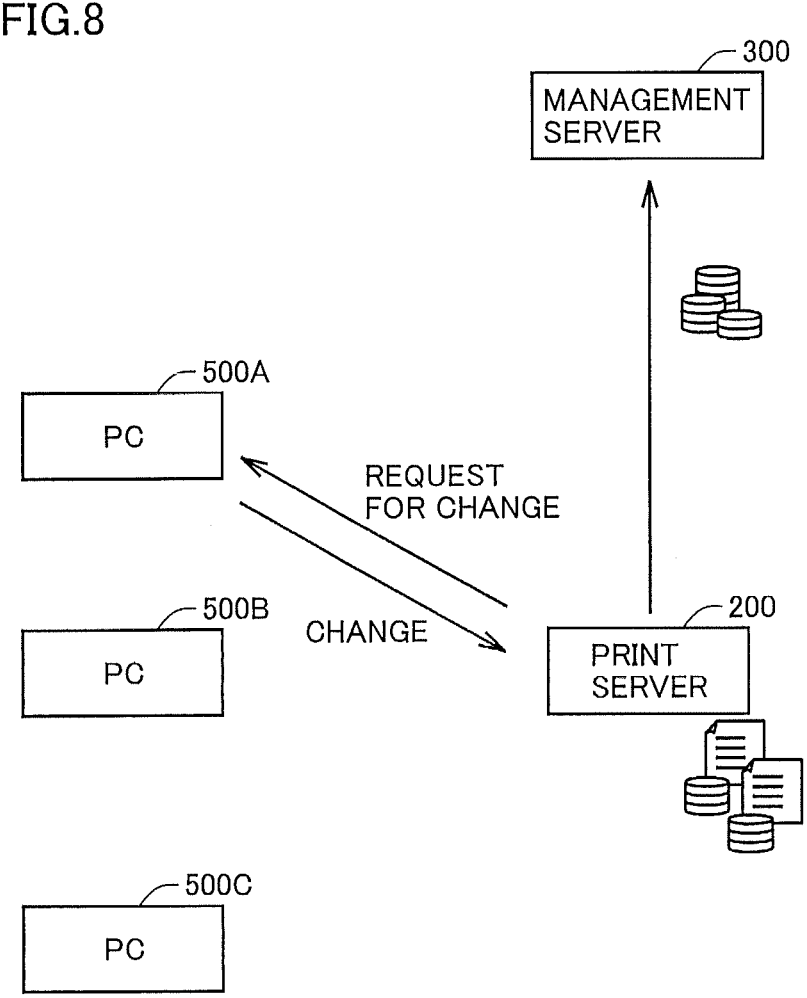

FIG. 8 illustrates a flow of operation in the case where a setting change of any one of jobs that are issued by users belonging to the group and are spooled in print server 200 is selected on the notice screen in FIG. 5. More specifically, referring to FIG. 8, in this case, print server 200 requests, from PC 500 that issues the job, a change to reduce the number of prints for at least one of jobs that are issued by users belonging to the group the user belongs to and are spooled at present.

Examples of a change to reduce the number of prints include a change from the single-sided print setting to the double-sided print setting, a change from the setting for printing one sheet of an original on one sheet of print paper to the setting for printing multiple sheets of originals on one sheet (N-in-1), and the like. In the case of the cost upper limit management, such a change includes a change from the color print setting to the monochrome print setting.

Which change is adopted may be preset in print server 200 or may be determined in accordance with an amount of balance deficit. The changes may be arranged in increasing order or decreasing order of reduction of the number of prints, and the content of the change may be determined in accordance with the arranged order. For example, first, the selected job may be changed to 2-in-1 print, and, if the balance is still in deficit, the job may be changed to 4-in-1 print. In this way, the changes may be determined step by step. Furthermore, different changes may be combined. For example, the selected job may be changed to 2-in-2 print, and, if the balance is still in deficit, the job is changed to duplex print in 2-in-1. In this way, the changes may be combined in accordance with the balance.

Print server 200 transmits the content of the change as a request to change to PC 500 of the user that issues the job of which change is requested. For example, this request may be displayed on the display of PC 500, and approval for change may be given in accordance with the screen so that an instruction for print change is transmitted to print server 200.

For example, when a change instruction is given from any one of PCs (PC 500A in FIG. 8) in response to the request through operation in accordance with the screen, print server 200 changes the print settings of the corresponding job and returns, to management server 300, the surplus produced by the change in the balance debited from management server 300 for the job when the job is spooled. Accordingly, the balance of the group is increased, so that the possibility that all the jobs of the group spooled in print server 200 can be printed is increased.

Here, all the jobs issued from users belonging to the group may be requested to be changed, or some selected jobs may be requested to be changed. The selection method may be similar to the method of selecting a job to be deleted as described in FIG. 7.

In the case where print settings are changed, jobs may be selected from the spooled jobs in decreasing order of the number of prints and changed, for example, to predetermined setting such as 2-in-1 setting until the deficit in the balance is reached. By doing so, the number of jobs having print settings changed can be minimized.

As another example, of the spooled jobs, for a job having the largest number of prints, the settings may be determined in such a manner that the settings are changed from the 2-in-1 setting to the 4-in-1 setting in order in which the print size from the original size is reduced until the deficit in the balance is reached. By doing so, the number of jobs having print settings changed can be reduced more.

As another example, the changes may be combined. Specifically, if the deficit in the balance is not reached even after the settings of the job having the largest number of prints are changed to a predefined level in order in which the print size is reduced, for example, from the 2-in-1 setting to the 4-in-1 setting, then the job having the next largest number of prints is changed similarly. In this manner, jobs may be selected in decreasing order of the number of prints until the deficit in the balance is reached. By doing so, the number of jobs having print settings changed can be reduced while degradation in quality of print results is suppressed.

As another example, the setting change is made such that the difference from the original settings is minimized, in which case, for example, all the spooled jobs are set to 2-in-1 setting. Then, if the deficit in the balance is not reached, print settings are changed until the deficit in the balance is reached. By doing so, the setting change that makes the smallest difference from the original print settings is made for all the jobs.

The job deletion and the print setting change as described above may be combined. In this case, a request for these processes may be made to PC 500 that issues the corresponding job, so that the job deletion and the print setting change can be selected and determined by the user's choice.

<Functional Configuration>

Figure 9:
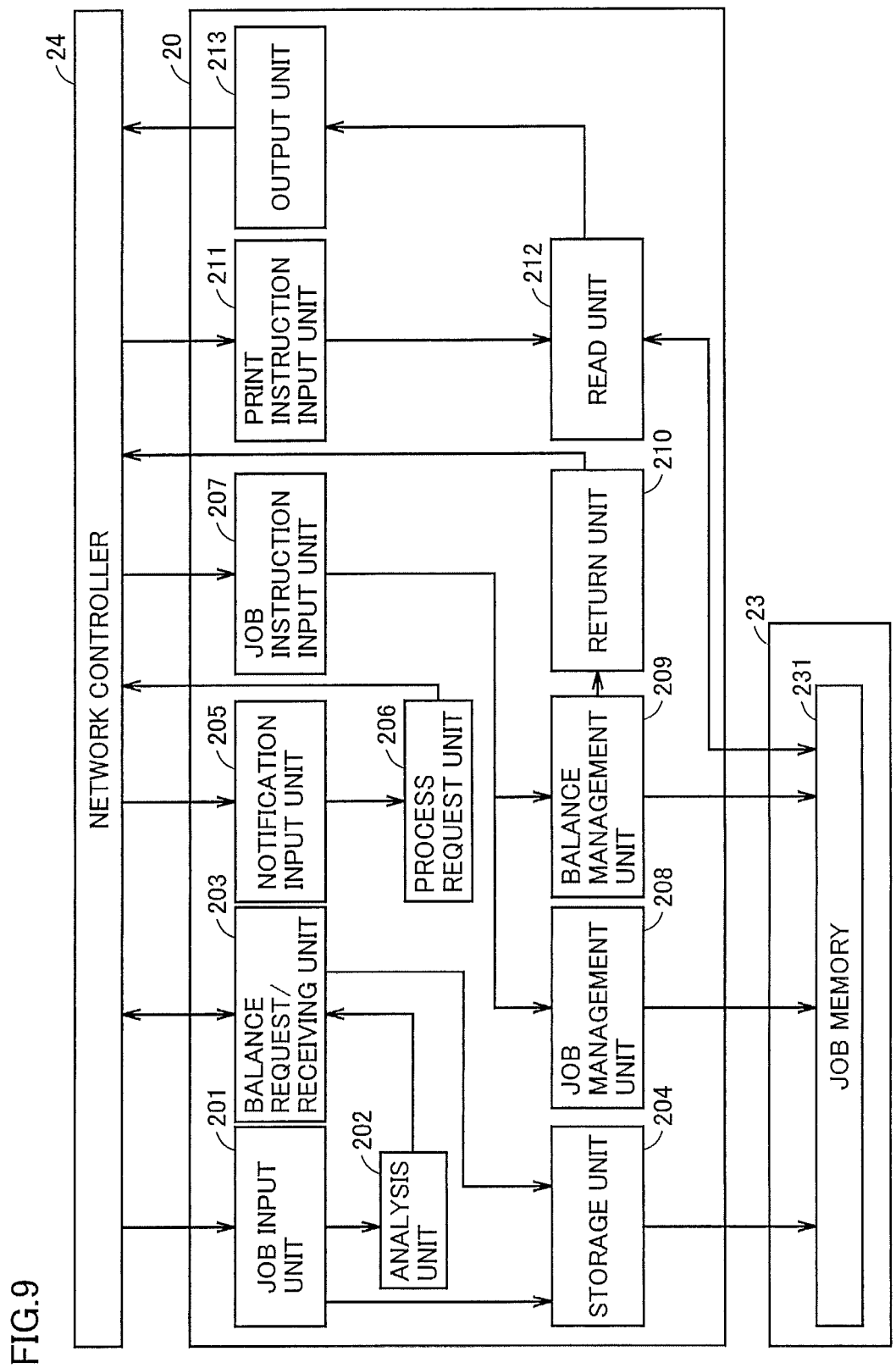
FIG. 9 is a diagram showing a specific example of a functional configuration of the print server.

FIG. 9 is a diagram showing a specific example of a functional configuration of print server 200 for performing the operation above. Each function shown in FIG. 9 is a function mainly formed on CPU 20 by CPU 20 of print server 200 reading out a program stored in ROM 21 and expanding the program on RAM 22 for execution. However, at least part of the functions may be implemented by the hardware configuration shown in FIG. 3.

Referring to FIG. 9, a job memory 231 that is a storage area for storing a job is provided in HD 23. Job memory 231 stores a job in association with the balance credited from management server 300 for the job.

Further referring to FIG. 9, CPU 20 includes a job input unit 201 for accepting input of a job issued from PC 500 through network controller 24, an analysis unit 202 for analyzing the job for analyzing the number of prints that is the usage amount of MFP 100, a balance request/receiving unit 203 for requesting a balance corresponding to the analyzed number of prints from management server 300 through network controller 24 and for receiving the balance from management server 300, a storage unit 204 for associating the job from PC 500 with the balance received from management server 300 for storage into job memory 231, a notification input unit 205 for receiving a notification of deficit from management server 300 through network controller 24 if the requested balance is in deficit, a process request unit 206 for specifying a job of which deletion or print setting change is requested based on the notification and for requesting a process such as deletion or setting change from PC 500 that issues the job through network controller 24, a job instruction input unit 207 for accepting an instruction related to the job from PC 500 receiving the request through network controller 24, a job management unit 208 for deleting the job stored in job memory 231 or changing the print settings in accordance with the instruction, a balance management unit 209 for deleting or reducing the balance stored in association with the corresponding job in accordance with the instruction, a return unit 210 for returning a surplus to management server 300 through network controller 24 if the balance credited from management server 300 has a surplus, a print instruction input unit 211 for designating a job and accepting input of a print instruction from MFP 100 through network controller 24, a read unit 212 for reading out the designated job from job memory 231 and for reading out the balance associated therewith, and an output unit 213 for outputting the corresponding job and the balance associated therewith to MFP 100 through network controller 24.

Figure 10:
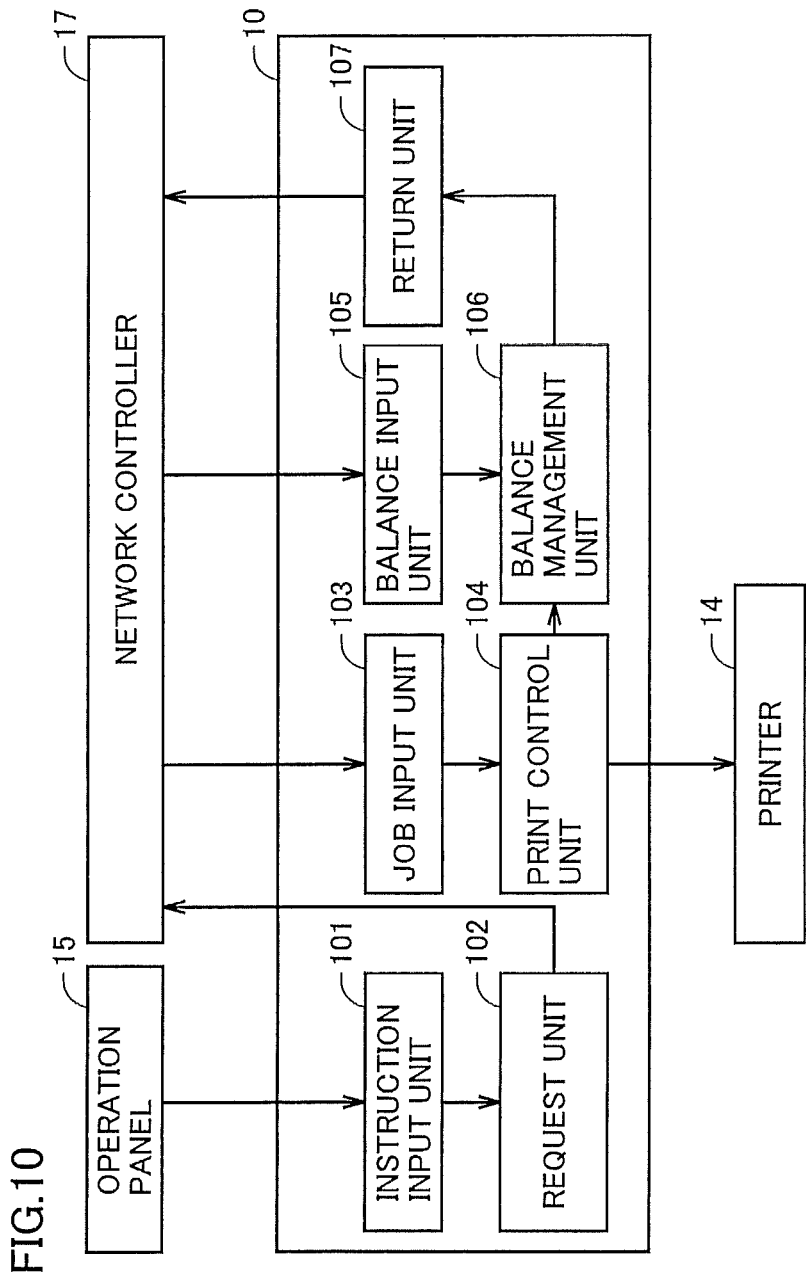
FIG. 10 is a diagram showing a specific example of a functional configuration of the MFP.

FIG. 10 is a diagram showing a specific example of a functional configuration of MFP 100 for performing the operation above. Each function shown in FIG. 10 is a function mainly formed on CPU 10 by CPU 10 of MFP 100 reading out a program stored in ROM 11 and expanding the program on RAM 12 for execution. However, at least part of the functions may be implemented by the hardware configuration shown in FIG. 2.

Referring to FIG. 10, CPU 10 includes an instruction input unit 101 for accepting an instruction input from operation panel 15, a request unit 102 for requesting the designated job from print server 200 through network controller 17 if the instruction is to designate a job for printing, a job input unit 103 for accepting input of a job from print server 200 through network controller 17, a print control unit 104 for controlling printer 14 to allow printer 14 to print the job, a balance input unit 105 for accepting input of the balance associated with the requested job from print server 200 through network controller 17, a balance management unit 106 for calculating the difference between the actual number of prints and the number of prints indicated by the balance associated with the job, as the surplus of the balance, based on the print result in printer 14, and a return unit 107 for returning the surplus to management server 300 through network controller 17.

<Operation Flow>

Figure 11:
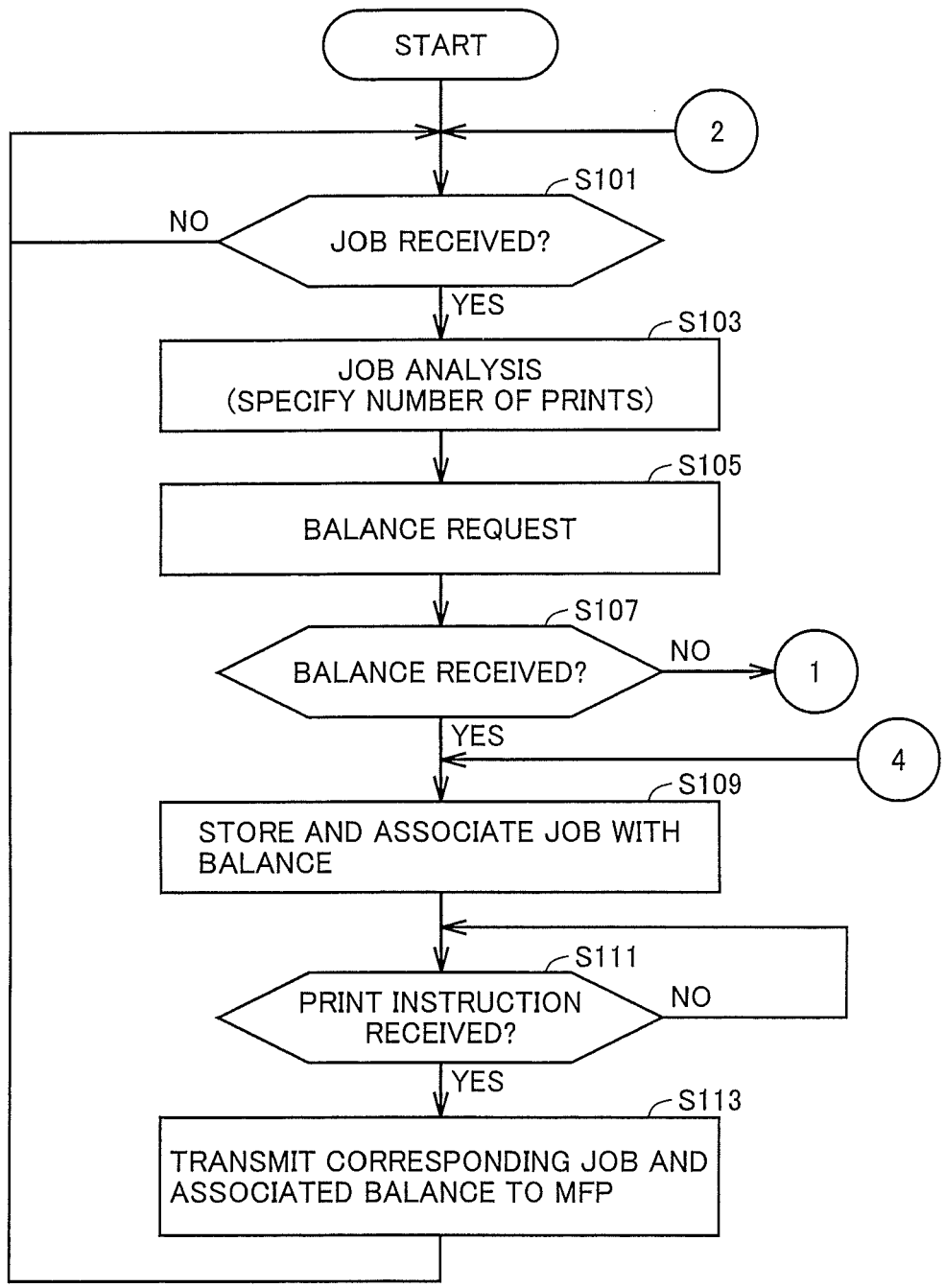
FIG. 11 to FIG. 13 are flowcharts illustrating a flow of operation in the print server.
Figure 12:
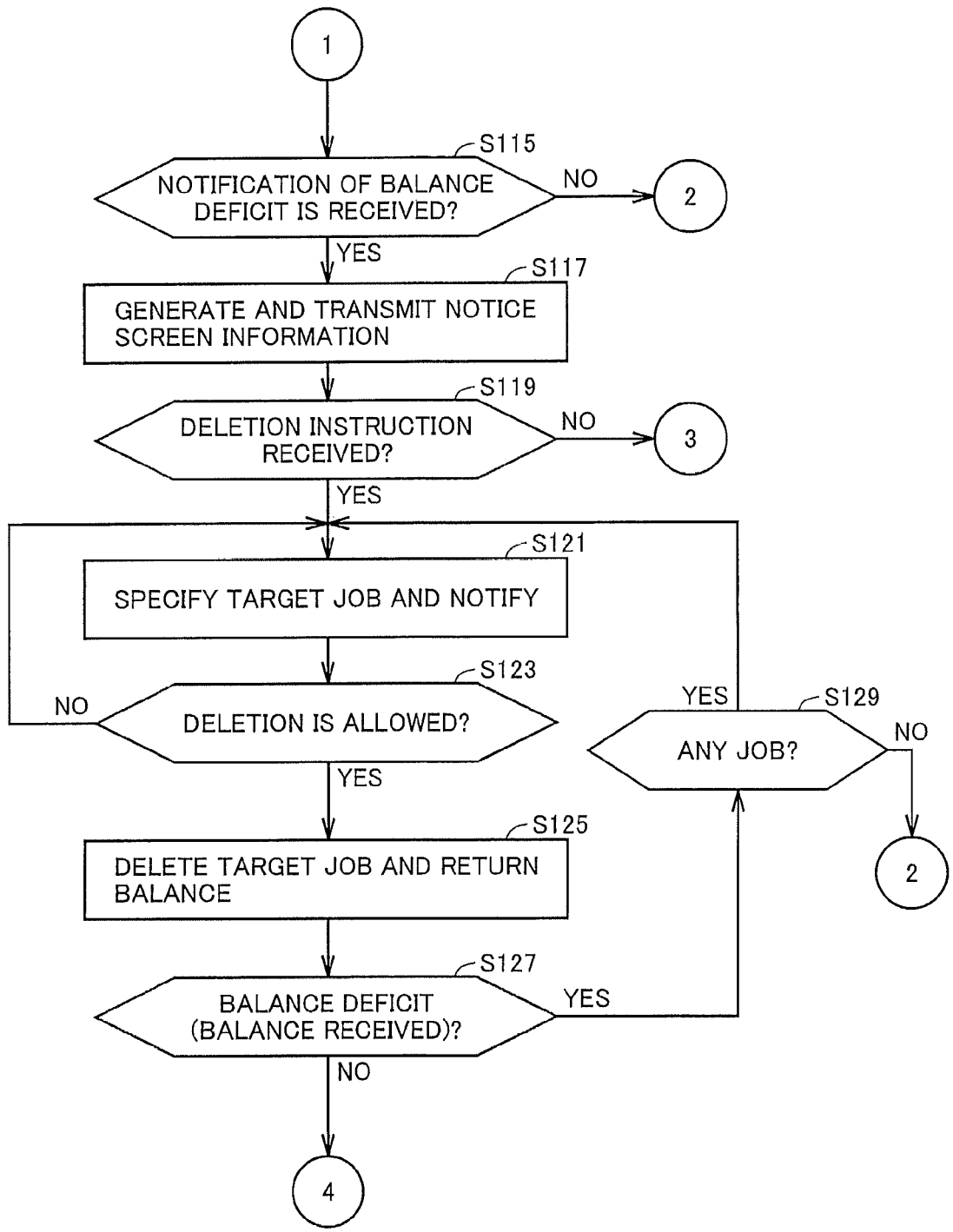
Figure 13:
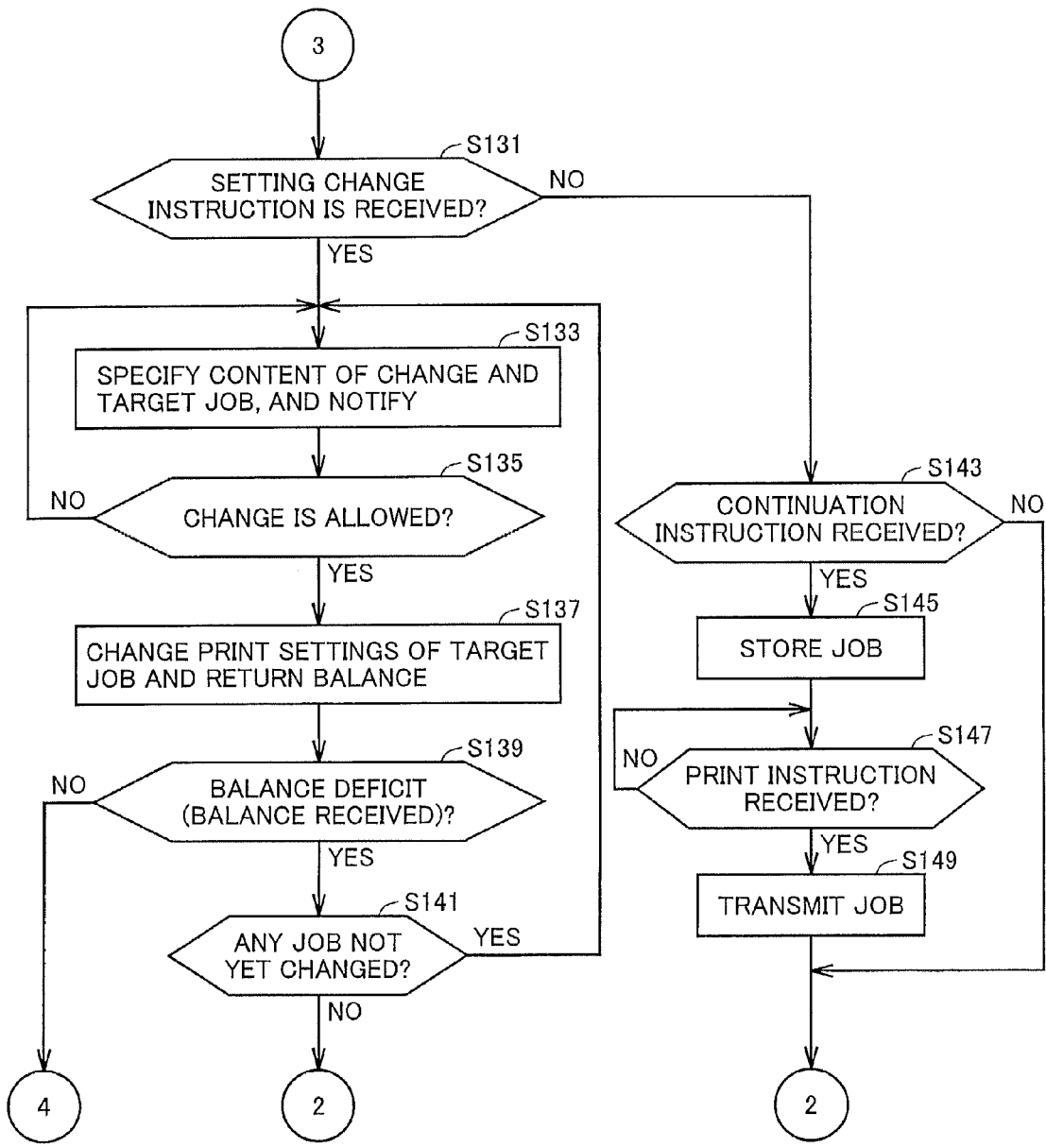

FIG. 11 to FIG. 13 are flowcharts illustrating a flow of operation in print server 200. The operation illustrated in FIG. 11 to FIG. 13 is implemented by CPU 20 of print server 200 reading out a program stored in ROM 21 and expanding the program on RAM 22 for execution to fulfill each function shown in FIG. 9.

Referring to FIG. 11, when CPU 20 receives a job issued from PC 500 (YES in step S101), in step S103, CPU 20 analyzes the job and specifies the number of prints required for printing the job. Then, in step S105, CPU 20 requests, from management server 300, the balance corresponding to the number of prints from the balance allocated to the group to which the user who issues the job belongs.

Upon receiving the balance from management server 300 in response to the request (YES in step S107), in step S109, CPU 20 associates the balance with the job for storage into HD 23.

Thereafter, when a print instruction with designation of the job is given from MFP 100 (YES in step S111), in step S113, CPU 20 transmits the designated job and the balance associated with the job to MFP 100 and terminates the operation.

Thereafter, CPU 20 goes back to the operation in step S101 above, waiting for reception of a job from PC 500.

The operation described above corresponds to the normal operation illustrated in FIG. 4.

Referring to FIG. 12, if a notification that the balance has a deficit is received from management server 300 in response to the request in step S105 above (YES in step S115), in step S117, CPU 20 generates information for displaying a screen to give a notice of the balance deficit as shown in FIG. 5, using the number of prints required for printing as specified in step S103 above and the present balance in the notification, and transmits the generated information to PC 500 that issues the job.

Upon receiving an instruction to delete a job that is issued by a user belonging to the group and is spooled in print server 200 from PC 500 in accordance with the notice screen (YES in step S119), in step S121, CPU 20 specifies the job to be deleted and notifies PC 500 that issues the specified job. In step S121, CPU 20 may specify all the jobs as targets to be deleted or may select a predetermined number of jobs or select jobs by the number corresponding to the deficit in accordance with the date and time of jobs created or the priority order assigned to the jobs.

If deletion is allowed, for example, with a deletion instruction given from PC 500 receiving the notification (YES in step S123), in step S125, CPU 20 deletes the corresponding job from HD 23 and returns the balance credited from management server 300 for that job to management server 300.

On the other hand, if the job specified in step S121 above cannot be deleted, for example, due to an instruction to prohibit deletion from PC 500 receiving the notification or in the absence of a deletion instruction for a predefined time (NO in step S123), CPU 20 performs the operation in step S121 above again to specify a next job as the next target to be deleted and notifies PC 500 that issues the job.

If the balance of the group becomes equal to or greater than the balance corresponding to the number of prints of the job received in step S101 above as a result of deletion of the job and return of the balance to management server 300 in step S125 above, that is, if the balance corresponding to the number of prints of the job received in step S101 above is transmitted from management server 300 (NO in step S127), CPU 20 goes back to the operation in step S109 above and associates the balance with the job for storage into HD 23. Then, the subsequent operation is performed.

On the other hand, if the balance is still in deficit even after deleting the job and returning the balance to management server 300 in step S125 above (YES in step S127), and if a job issued from a user belonging to the group is still stored in HD 23 (YES in step S129), CPU 20 goes back to the operation in step S121 above to specify a job to be deleted and repeats the subsequent operation.

If the balance is still in deficit even after deleting all the jobs that can be deleted (NO in step S129), CPU 20 determines that a print process for the job received in step S101 above cannot be performed, skips the subsequent operation without storing the job in HD 23, and goes back to the operation in step S101 above, waiting for reception of a job from PC 500.

The operation described above corresponds to the operation illustrated in FIG. 7.

Referring to FIG. 13, upon receiving an instruction to change the print settings of a job that is issued by a user belonging to the group and is spooled in print server 200 from PC 500 in accordance with the notice screen transmitted in step S117 above (YES in step S131), in step S133, CPU 20 specifies the job as a target of print setting change and notifies PC 500 that issues the specified job. In step S133, CPU 20 may specify all the jobs as targets to be changed or may select a predetermined number of jobs or select jobs by the number corresponding to the deficit in accordance with the date and time of jobs created or the priority order assigned to the jobs. The content of the change may be predefined or may be specified in accordance with the balance deficit.

If a print setting change is allowed, for example, with an instruction to change settings from PC 500 receiving the notification (YES in step S135), in step S137, CPU 20 changes the print settings of the corresponding job and returns the surplus produced by this change in the balance credited for the job to management server 300.

On the other hand, if the print settings of the job specified in step S133 above cannot be changed due to an instruction to prohibit a change from PC 500 receiving the notification or in the absence of a change instruction within a predefined time (NO in step S135), CPU 20 performs the operation in step S133 again to specify a next job for changing print settings and notifies PC 500 that issues the job. Here, the content of the change may also be specified.

If the balance of the group becomes equal to or greater than the balance corresponding to the number of prints of the job received in step S101 above as a result of returning the balance surplus produced by changing the print settings of the job in step S137 above, to management server 300, that is, if the balance corresponding to the number of prints of the job received in step S101 above is transmitted from management server 300 (NO in step S139), CPU 20 goes back to the operation in step S109 above and associates the balance with the job for storage into HD 23. Then, the subsequent operation is performed.

On the other hand, if the balance is still in deficit even after changing the print settings of the job and returning the balance surplus to management server 300 in step S137 above (YES in step S139), and if a job issued by a user belonging to the group and having the print settings not yet changed is still stored in HD 23 (YES in step S141), CPU 20 goes back to the operation in step S133 above to specify a job for changing print settings and repeats the subsequent operation.

If the balance is still in deficit even after changing the print settings of all the jobs that can be changed or after changing the contents that can be changed (NO in step S141), CPU 20 determines that a print process of the job received in step S101 above cannot be performed, skips the subsequent operation without storing the job in HD 23, and goes back to the operation in step S101 above, waiting for reception of a job from PC 500.

The operation described above corresponds to the operation illustrated in FIG. 8.

Upon receiving an instruction to continue spooling of the issued job from PC 500 in accordance with the notice screen transmitted in step S117 above (YES in step S143), in step S145, CPU 20 stores the job received in step S101 above into HD 23 without associating it with the balance.

Thereafter, when a print instruction with designation of a job is given from MFP 100 (YES in step S147), in step S149, CPU 20 transmits the designated job to MFP 100 and terminates the operation.

Thereafter, CPU 20 goes back to the operation in step S101 above, waiting for reception of a job from PC 500.

The operation described above corresponds to the operation in the case of continuation of spooling as illustrated in FIG. 6.

When an instruction to cancel spooling is given from PC 500 in accordance with the notice screen transmitted in step S117 above (NO in step S143), CPU 20 skips the subsequent operation as a whole and goes back to the operation in step S101 above, waiting for reception of a job from PC 500.

Figure 14:
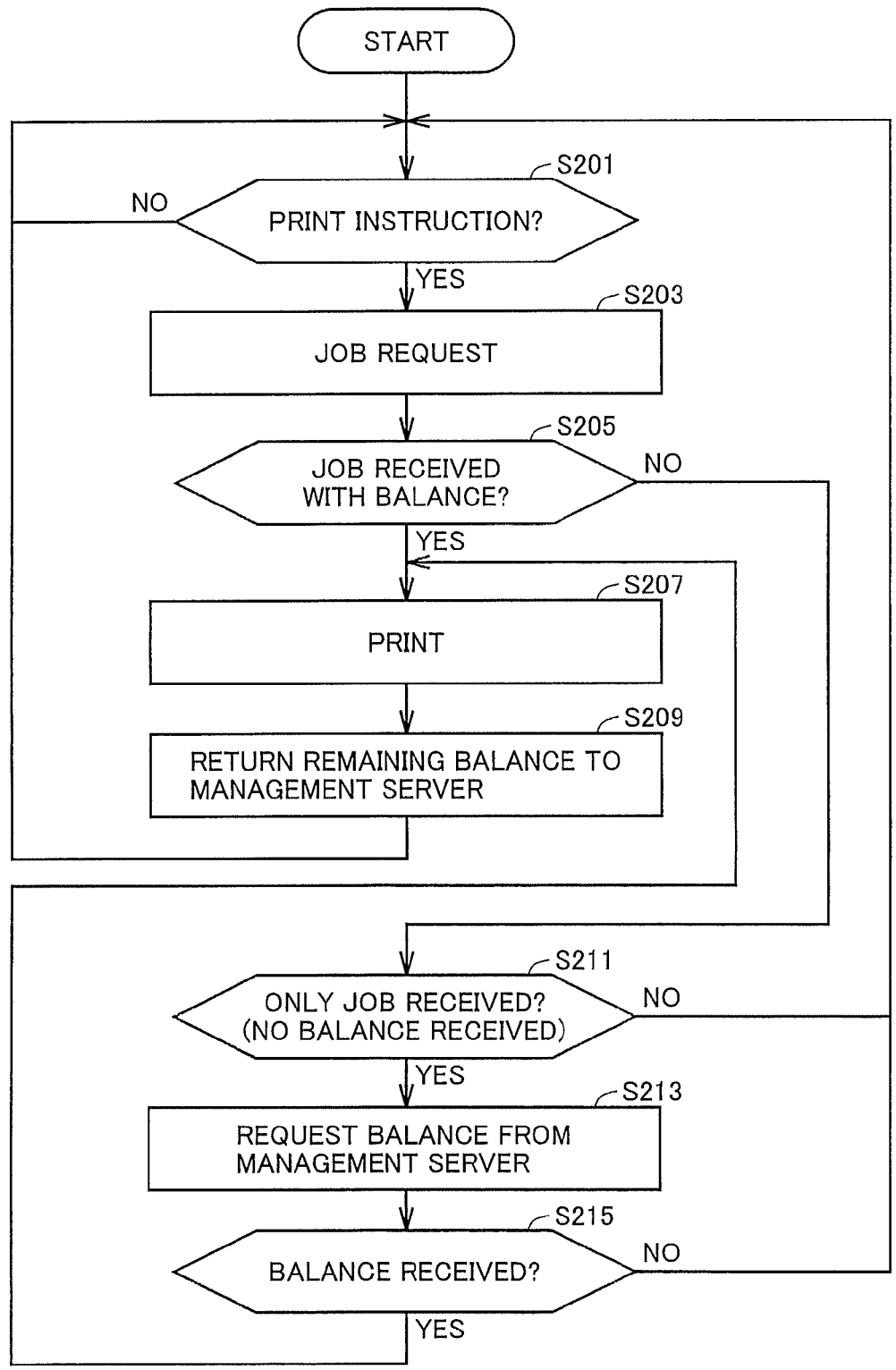
FIG. 14 is a flowchart illustrating a flow of operation in the MFP.
Figure 15:
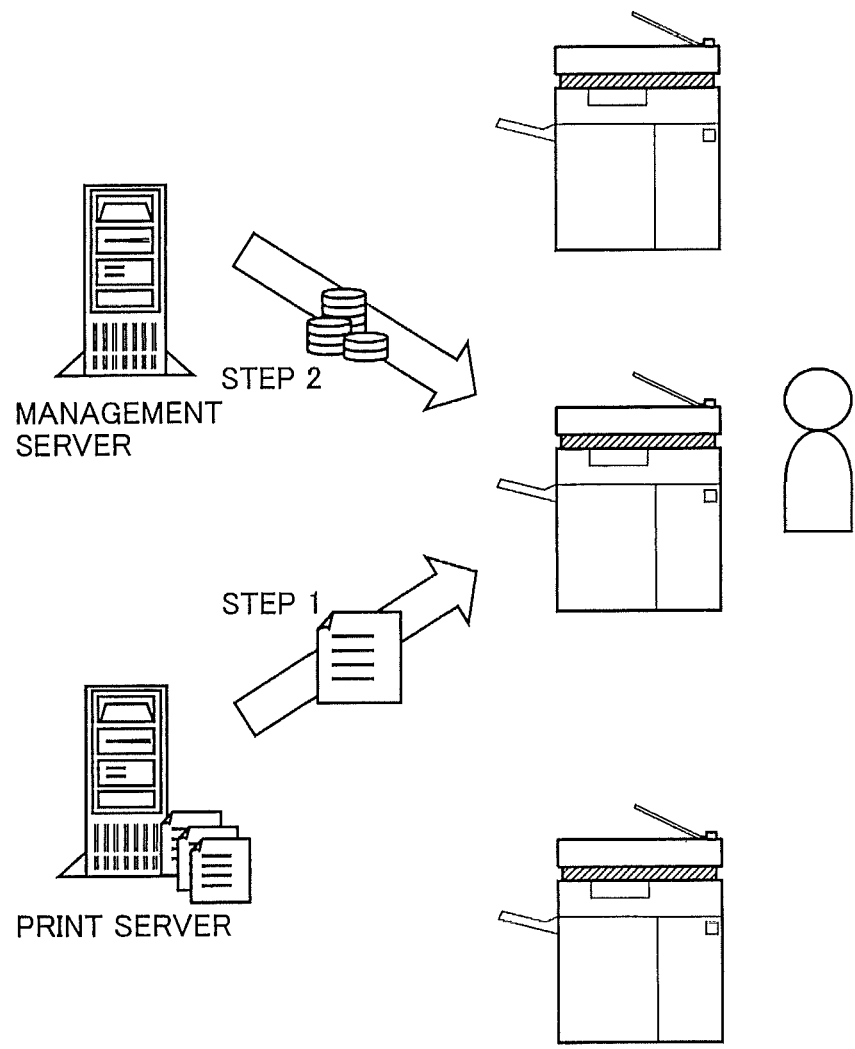
FIG. 15 is a diagram illustrating an example of a flow of upper limit management of the number of prints in an image processing system.

FIG. 14 is a flowchart illustrating a flow of operation in MFP 100. The operation illustrated in FIG. 14 is implemented by CPU 10 of MFP 100 reading out a program stored in ROM 11 and expanding the program on RAM 12 for execution to fulfill each function shown in FIG. 10.

Referring to FIG. 14, when a print instruction is given with designation of a job using operation panel 15 or the like (YES in step S201), in step S203, CPU 10 requests the designated job from print server 200.

Here, if the job is transmitted together with the balance associated with the job from print server 200 (YES in step S205), in step S207, CPU 10 executes printing of the job and, in step S209, CPU 10 calculates the difference between the actual number of prints and the number of prints represented by the transmitted balance, as the balance surplus, and returns the surplus to management server 300.

On the other hand, if the job is transmitted without being associated with the balance from print server 200 in response to the request in step S203 above (YES in step S211), in step S213, CPU 10 requests the balance corresponding to the number of prints required for printing the job from management server 300. This is the case where a notification of the balance deficit is given from management server 300 when the job is spooled in print server 200, and the operation in steps S143 to S149 above is performed in print server 200.

If the balance is transmitted from management server 300 in response to the request in step S213 above (YES in step S215), CPU 10 goes back to the operation in step S207 above and allows execution of printing of the job. Then, the surplus of the balance transmitted from management server 300 is returned to management server 300.

If the balance is not transmitted from management server 300 in response to the request in step S213 (NO in step S215), CPU 10 determines that the job cannot be printed due to the balance deficit, skips the operation following step S207 above, and goes back to the operation in step S201 above. Here, the notice thereof may appear on operation panel 15, for example.

<Effect of Embodiment>

The operation described above is performed in the image processing system so that print server 200 requests the balance required for printing a job from management server 300 at a point of time when the job is issued from PC 500 to print server 200. That is, the number of sheets required for the job is reserved from the available number of sheets allocated to the user or the group to which the user belongs.

This can prevent such a situation in that the number of sheets for printing the job is short at a time when a print instruction for the job is given, or the upper limit of the number of prints is reached during progress of printing. Therefore, the following situations can be avoided: the job is not printed although MFP 100 is operated to print the job spooled in print server 200; and printing is interrupted halfway during progress of printing of a job due to shortage of sheets although print is started. Thus, the user's convenience is improved.

In the description above, the number of prints is mainly focused as the usage amount of MFP 100. However, the upper limit management may be performed on the consumption amount of toner or other consumables in a similar manner as previously mentioned. The upper limit management of costs incurred for the process may be performed.

Although the configuration of the image processing system is illustrated as in FIG. 1 in the foregoing description, the system configuration is not limited to this configuration. Specifically, as another example, print server 200 and management server 300 may be configured in a single server, or the server function of at least one of print server 200 and management server 300 may be included in one of a plurality of MFPs 100.

A program may be provided which allows print server 200 and MFP 100 to execute the operation as described above. Such a program may be recorded in a computer readable recording medium attached to a computer, such as a flexible disk, a CD-ROM (Compact Disk-Read Only Memory), a ROM, a RAM, and a memory card, and provided as a program product. Alternatively, the program may be recorded in a recording medium such as a hard disk contained in a computer. Alternatively, the program may be downloaded via a network.

The program in accordance with the present invention may allow the process to be executed by invoking necessary modules, among program modules provided as a part of Operating System (OS) of a computer, in a prescribed sequence at a prescribed timing. In this case, the aforementioned modules are not included in the program itself and the process is executed in cooperation with OS. The program that does not include such modules may also be included in the program in accordance with the present invention.

Furthermore, the program in accordance with the present invention may be incorporated into a part of another program. In this case, the modules included in another program are not included in the program itself, and the process is executed in cooperation with another program. Such a program incorporated in another program may also be included in the program in accordance with the present invention.

The program product to be provided is installed in a program storage unit such as a hard disk for execution. It is noted that the program product includes the program itself and a recording medium encoded with the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing system comprising
a server for managing a job issued by an issuer, and
an image forming apparatus,
wherein, upon accepting said issued job and before said job is processed by said image forming apparatus, said server is configured to (i) specify a usage amount of said image forming apparatus in a case where said job is processed by said image forming apparatus, as a usage amount for said job, and (ii) reserve the usage amount for said job from the usage amount of said image forming apparatus that is permitted to the issuer of said job,
wherein when the server reserves the usage amount for said job from the usage amount of said image forming apparatus, said server further stores the usage amount for said job and stores said job in association with the usage amount of said job, and
wherein when the server does not reserve the usage amount for said job from the usage amount of said image forming apparatus that is permitted to the issuer of said job, said server requests an issuer of another job stored prior to said job to reduce the usage amount of said image forming apparatus.

2. The image processing system according to claim 1, wherein when said stored other job is updated, said server updates the usage amount for said job in accordance with said update and allows a difference from the usage amount for said job before update to be reflected in the usage amount of said image forming apparatus that is permitted to the issuer of said job.

3. The image processing system according to claim 2, wherein when said stored other job stored is deleted, said server returns the usage amount for said stored other job to the usage amount of said image forming apparatus that is permitted to the issuer of said job.

4. The image processing system according to claim 1, wherein:
when said job is requested by said image forming apparatus, said server transmits said job and information indicative of the usage amount for said job to said image forming apparatus; and
said image forming apparatus returns a difference between the usage amount of said image forming apparatus in processing said job and the usage amount for said job, to the usage amount of said image forming apparatus that is permitted to the issuer of said job.

5. The image processing system according to claim 1, wherein when the usage amount for said job is not reserved from the usage amount of said image forming apparatus that is permitted to the issuer of said job, said server requests deletion of another job stored prior to said job from the issuer of said another job.

6. The image processing system according to claim 5, wherein when a plurality of other jobs are stored prior to said job, said server selects a job of which deletion is requested, in accordance with attributes of said plurality of other jobs.

7. The image processing system according to claim 5, wherein when a reply to said request is not given from the issuer of said another job for a predefined period, said server does not delete said other job.

8. The image processing system according to claim 1, wherein when the usage amount for said job is not reserved from the usage amount of said image forming apparatus that is permitted to the issuer of said job, said server requests the issuer of another job stored prior to said job to change a setting of said another job concerning the usage amount of said image forming apparatus such that the usage amount is reduced.

9. The image processing system according to claim 8, wherein when a plurality of other jobs are stored prior to said job, said server selects a job of which setting concerning the usage amount of said image forming apparatus is requested to be changed among said plurality of other jobs, in accordance with attributes of said plurality of other jobs.

10. The image processing system according to claim 9, wherein said server determines the usage amount for said job so as to fall within the usage amount of said image forming apparatus that is permitted to the issuer of said job, by selecting a job of which a setting concerning the usage amount of said image forming apparatus is requested to be changed, in decreasing order of the usage amount of said image forming apparatus for each of said plurality of other jobs, and then changing the setting concerning the usage amount of said image forming apparatus step by step in order in which a difference from original setting for the selected job increases.

11. The image processing system according to claim 8, wherein when a reply to said request is not given from the issuer of said another job for a predefined time, said server does not change setting of said another job.

12. A server comprising:
a controller for managing a job issued by an issuer and for executing processing,
wherein, upon accepting said issued job and before said job is processed by an image forming apparatus, said controller is configured to (i) specify a usage amount of said image forming apparatus in a case where said job is processed by said image forming apparatus, as a usage amount for said job, and (ii) reserve the usage amount for said job from the usage amount of said image forming apparatus that is permitted to the issuer of said job,
wherein when said controller reserves said usage amount for said job from the usage amount of said image forming apparatus, said controller further stores said job in association with the usage amount for said job, and
wherein when the controller does not reserve the usage amount for said job from the usage amount of said image forming apparatus that is permitted to the issuer of said job, said controller requests an issuer of another job stored prior to said job to reduce the usage amount of said image forming apparatus.

13. The server according to claim 12, wherein when the usage amount for said job is not reserved from the usage amount of said image forming apparatus that is permitted to the issuer of said job, said controller requests deletion of another job stored prior to said job from the issuer of said another job.

14. The server according to claim 12, wherein when the usage amount for said job is not reserved from the usage amount of said image forming apparatus that is permitted to the issuer of said job, said controller requests the issuer of another job stored prior to said job to change a setting of said another job concerning the usage amount of said image forming apparatus such that the usage amount is reduced.

15. An image forming apparatus comprising:
a controller for managing a job issued by an issuer and for executing processing,
wherein upon accepting said issued job and before said job is processed by said image forming apparatus, said controller is configured to (i) specify a usage amount of said image forming apparatus in a case where said job is processed by said image forming apparatus, as a usage amount for said job, and (ii) reserve the usage amount for said job from the usage amount of said image forming apparatus that is permitted to the issuer of said job,
wherein when said usage amount for said job is reserved from the usage amount of said image forming apparatus, said controller stores said job in association with the usage amount for said job, and
wherein when the usage amount for said job is not reserved from the usage amount of said image forming apparatus that is permitted to the issuer of said job, said controller requests an issuer of another job stored prior to said job to reduce the usage amount of said image forming apparatus.

16. The image forming apparatus according to claim 15, wherein when the usage amount for said job is not reserved from the usage amount of said image forming apparatus that is permitted to the issuer of said job, said controller requests deletion of another job stored prior to said job from the issuer of said another job.

17. The image forming apparatus according to claim 15, wherein when the usage amount for said job is not reserved from the usage amount of said image forming apparatus that is permitted to the issuer of said job, said controller requests the issuer of another job stored prior to said job to change a setting of said another job concerning the usage amount of said image forming apparatus such that the usage amount is reduced.

18. A method of managing a usage amount of an image forming apparatus for an issuer of a job, comprising the steps of:
accepting, by a server, said issued job; and
specifying, by the server, a usage amount of said image forming apparatus in a case where said job is processed by said image forming apparatus, as a usage amount for said job, said server being configured to reserve the usage amount for said job,
wherein when the usage amount for said job is reserved from the usage amount of said image forming apparatus that is permitted to the issuer of said job; storing, by the server, said job in association with the usage amount for said job into a storage device, and
wherein when the usage amount for said job is not reserved from the usage amount of said image forming apparatus that is permitted to the issuer of said job, requesting, by the server, an issuer of another job stored prior to said job to reduce the usage amount of said image forming apparatus.

19. The method according to claim 18, wherein when the usage amount for said job is not reserved from the usage amount of said image forming apparatus that is permitted to the issuer of said job, the method further comprises:
requesting, by the server, deletion of another job stored prior to said job from the issuer of said another job.

20. The method according to claim 18, wherein when the usage amount for said job is not reserved from the usage amount of said image forming apparatus that is permitted to the issuer of said job, the method further comprises:
requesting, by said server, the issuer of another job stored prior to said job to change a setting of said another job concerning the usage amount of said image forming apparatus such that the usage amount is reduced.

21. A non-transitory computer-readable storage medium encoded with a program for causing a server to perform a process of managing a job, said program instructing a controller of said server, which is configured to reserve a usage amount, to perform processing comprising the steps of:
accepting said issued job; and
specifying the usage amount of an image forming apparatus in a case where said job is processed by said image forming apparatus, as a usage amount for said job,
wherein when said controller reserves the usage amount for said job from the usage amount of said image forming apparatus that is permitted to an issuer of said job, said controller stores said job in association with the usage amount for said job into a storage device, and
wherein when said controller does not reserve the usage amount for said job from the usage amount of said image forming apparatus that is permitted to the issuer of said job, said controller requests an issuer of another job stored prior to said job to reduce the usage amount of said image forming apparatus.

22. The non-transitory computer readable storage medium according to claim 21, wherein when the usage amount for said job is not reserved from the usage amount of said image forming apparatus that is permitted to the issuer of said job, said program further instructs the controller to request deletion of another job stored prior to said job from the issuer of said another job.

23. The non-transitory computer readable storage medium according to claim 21, wherein the usage amount for said job is not reserved from the usage amount of said image forming apparatus that is permitted to the issuer of said job, said program further instructs the controller to request the issuer of another job stored prior to said job to change a setting of said another job concerning the usage amount of said image forming apparatus such that the usage amount is reduced.

24. A non-transitory computer-readable storage medium encoded with a program for causing an image forming apparatus to perform a process of managing a job, comprising the steps of:
accepting a job issued by an issuer; and
upon accepting said issued job and before processing said job, specifying a usage amount of said image forming apparatus as a usage amount for said job,
wherein when the usage amount for said job is reserved from the usage amount of said image forming apparatus that is permitted to the issuer of said job, storing said job in association with the usage amount for said job, and
wherein when the usage amount for said job is not reserved from the usage amount of said image forming apparatus that is permitted to the issuer of said job, requesting an issuer of another job stored prior to said job to reduce the usage amount of said image forming apparatus.

25. The non-transitory computer-readable medium according to claim 24, wherein when the usage amount for said job is not reserved from the usage amount of said image forming apparatus that is permitted to the issuer of said job, the program further causes the image forming apparatus to request deletion of another job stored prior to said job from the issuer of said other job.

26. The non-transitory computer-readable medium according to claim 24, wherein when the usage amount for said job is not reserved from the usage amount of said image forming apparatus that is permitted to the issuer of said job, said program further causes the image forming apparatus to request the issuer of another job stored prior to said job to change a setting of said other job concerning the usage amount of said image forming apparatus such that the usage amount is reduced.

* * * * *